United States Patent [19]
Abe et al.

[11] Patent Number: 5,680,503
[45] Date of Patent: Oct. 21, 1997

[54] HONEYCOMB HEATER HAVING A PORTION THAT IS LOCALLY QUICKLY HEATED

[75] Inventors: Fumio Abe, Handa; Tomoharu Kondo, Toki, both of Japan

[73] Assignee: NGK Insulators, Ltd., Japan

[21] Appl. No.: 354,415

[22] Filed: Dec. 12, 1994

[30] Foreign Application Priority Data

Dec. 14, 1993 [JP] Japan ................................. 5-313753

[51] Int. Cl.$^6$ ................... F01N 3/28; F01N 3/20; B01D 53/36; H05B 3/00
[52] U.S. Cl. ................... 392/485; 219/552; 60/300; 55/DIG. 30; 422/174
[58] Field of Search ................... 392/480, 485–489; 60/300; 219/552, 505, 553; 422/174, 177, 179; 55/DIG. 30; 428/16

[56] References Cited

U.S. PATENT DOCUMENTS

| | | | |
|---|---|---|---|
| 3,770,389 | 11/1973 | Kitzner et al. | 23/288 |
| 5,194,229 | 3/1993 | Abe et al. | 422/174 |
| 5,202,547 | 4/1993 | Abe et al. | 219/552 |
| 5,204,066 | 4/1993 | Abe et al. | 422/174 |
| 5,229,080 | 7/1993 | Abe et al. | 422/174 |
| 5,277,937 | 1/1994 | Bagley et al. | 422/174 |
| 5,286,460 | 2/1994 | Abe et al. | 422/174 |
| 5,296,198 | 3/1994 | Abe et al. | 422/180 |
| 5,318,757 | 6/1994 | Abe et al. | 422/174 |
| 5,393,586 | 2/1995 | Lipp | 428/116 |
| 5,399,841 | 3/1995 | Abe et al. | 219/552 |
| 5,533,167 | 7/1996 | Kondo et al. | 422/174 |

*Primary Examiner*—Tu B. Hoang
*Attorney, Agent, or Firm*—Parkhurst, Wendel & Burr, L.L.P.

[57] ABSTRACT

A honeycomb heater comprising a honeycomb structure and a catalyst layer supported on partition walls of the honeycomb structure. The honeycomb heater includes a first portion that is resistance adjusted such that the first portion is adapted to heat more quickly than a second portion of the honeycomb heater. The first portion includes at least an inlet end of the honeycomb that receives gas that flows therethrough. In addition, the first portion has an area along the gas inlet within a range of 5 to 50% of the sectional area of the gas inlet. The first portion may extend through the honeycomb structure and terminate before reaching the gas outlet of the heater. The partition walls of the first portion may have a different hydraulic diameter, different thickness or different cell density than the second portion of the honeycomb heater.

4 Claims, 5 Drawing Sheets

FIG. 2a
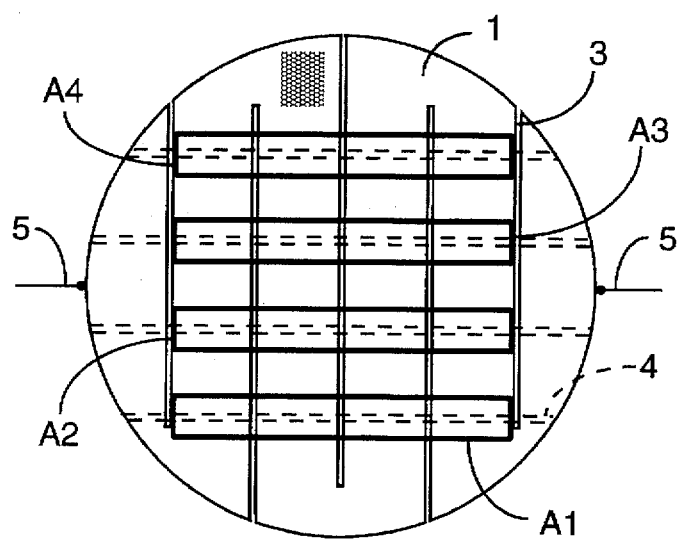
FIG. 2b
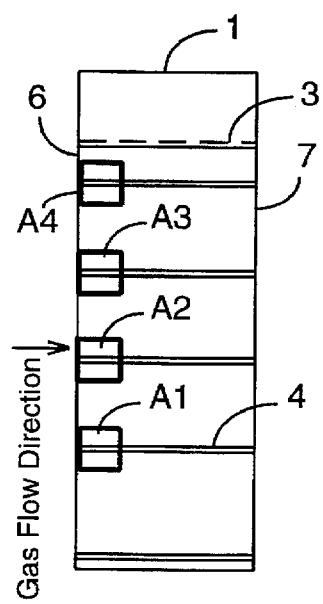
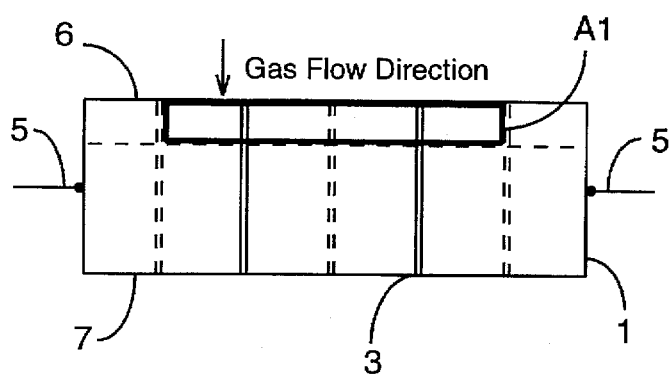
FIG. 2c

FIG. 3a
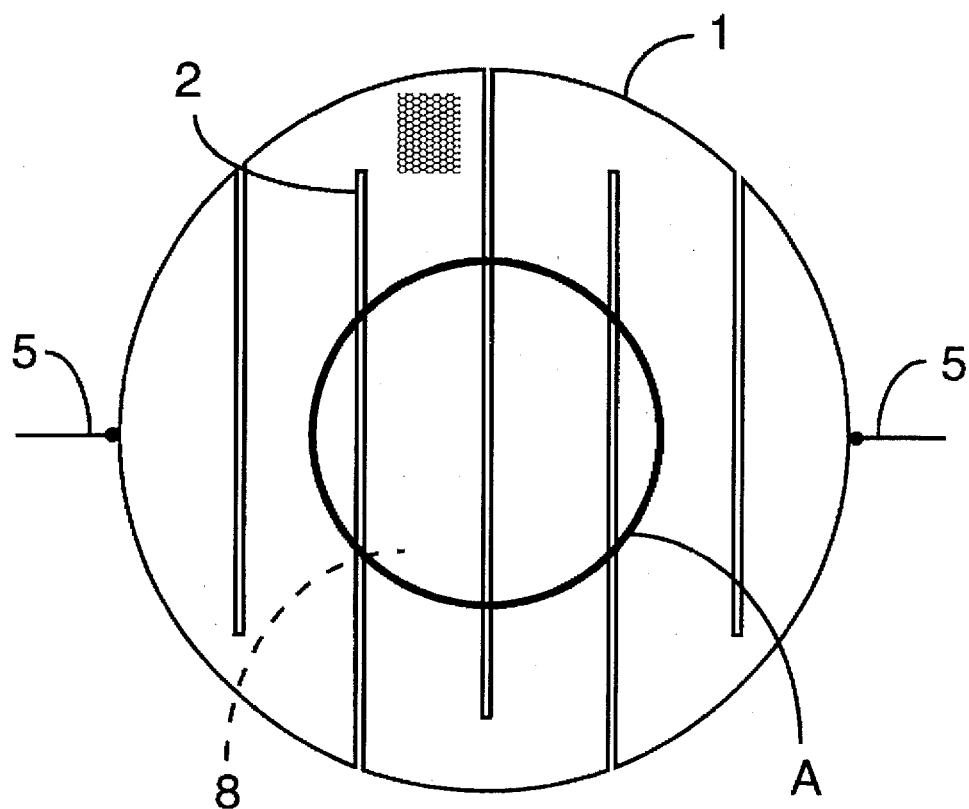
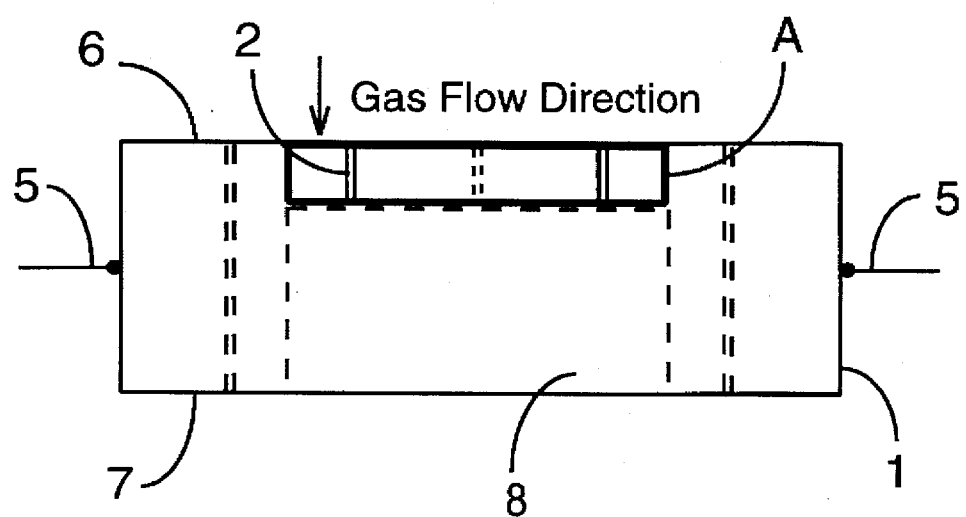
FIG. 3b

HONEYCOMB HEATER HAVING A PORTION THAT IS LOCALLY QUICKLY HEATED

BACKGROUND OF THE INVENTION (i) Field of the Invention

The present invention relates to an electrical heating type honeycomb heater and its method operation. The honeycomb heater can suitably be used in an exhaust gas purification system for effectively purifying harmful components such as hydrocarbons (HC), carbon monoxide (CO) and nitrogen oxides ($NO_x$) in exhaust gas exhausted from an internal combustion engine, particularly HC generated in large quantities at the time of an engine start (at a cold start).

(ii) Description of the Prior Art

Heretofore, an research and development of an automobile exhaust gas purification systems for purifying harmful components such as HC, CO and $NO_x$ in an exhaust gas from a car have been actively carried out, but particularly in recent years, the purification of these harmful substances at a cold start of the car has been an important technical theme due to intensification of exhaust gas regulations.

That is to say, when the temperature of such an exhaust gas as exhausted immediately after the start of an engine is low, a catalyst does not reach its functional temperature, and so the purification ability of the catalyst is poor. In addition, at this time, HC are exhausted in a larger amount than at the time of a steady running.

As one means for solving such a technical problem, much attention has been paid to a technique in which an electrical heating type heater is electrified before or simultaneously with the start of the engine to quickly heat the catalyst supported on the heater, the so-called light-off catalyst and main catalyst and the like closely arranged in the rear of the heater up to the functional temperature of the catalysts.

For example, Japanese Patent Application Laid-open No. 295184/1991 which has been filed by the present applicants discloses a resistance adjustable type heater in which at least two electrodes for electrification are attached to a honeycomb structure having a number of passages, and a resistance adjusting means comprising slits or the like is provided between the electrodes.

Furthermore, Japanese Patent Application Laid-open No. 38042/1993 is concerned with a heating type metal carrier catalyst in which consumed power is limited, and this patent application describes a local heating type heater having, on the inlet side of an exhaust gas, a portion where the resistance of a conductive route of a metal carrier locally increases. In this disclosed invention, the resistance in the local heating portion can be adjusted by forming an orifice or a slit in the heater or changing the wall thickness of a metal foil constituting a metal carrier.

In addition, Japanese Patent Application Laid-open No. 168946/1993 has described a heater for electrifying and heating a certain region alone of a metallic catalyst carrier comprising the laminate of metallic thin plates on whose surface an insulating film is formed. Concretely, this patent application discloses a catalyst device in which the thin plates are conductively joined to each other partially by brazing, discharge welding, laser welding or the like to reduce its resistance, whereby the unjoined portions alone of the thin plates are predominantly heated.

However, in the resistance adjustable type heater described in Japanese Patent Application Laid-open No. 295184/1991, a heating rate is low, when the whole heater is heated and a low electric power is applied. Thus, the catalyst supported on the heater cannot reach an ignition temperature in a short period of time, with the result that most of HC generated in large quantities at the time of a cold start is passed through the catalyst without being purified. On the other hand, if a large electric power is applied to quickly heat the heater, a large-capacity battery, heavy cables and a control device are required.

If such a local heating type heater as described in Japanese Patent Application Laid-open Nos. 138042/1993 and 168946/1993 is used, the heat capacity of the heating portion can be reduced, and so the heating portion can be heated in a short time by applying the low electric power. However, portions having low temperatures other than the heating portion are also present, and hence, most of HC exhausted at the time of the cold start inconveniently pass through these low-temperature portions as they are not purified. Since a ratio of the heating portion to a whole gas passage and an operation method are not prescribed, it is difficult to obtain a sufficient purification performance.

SUMMARY OF THE INVENTION

In view of such conventional circumstances, the present invention has been completed. An object of the present invention is to provide a honeycomb heater which can exert a suitable purification performance by the application of a low electric power, and another object of the present invention is to provide an operation method of the honeycomb heater.

The present invention is directed to a honeycomb heater, comprising a honeycomb structure including a plurality of partition walls comprised of a conductive material, the partition walls forming a plurality of passages extending substantially parallel to a gas flow direction, the honeycomb structure having a first end providing a gas inlet and a second end providing a gas outlet, and at least two electrodes connected to the honeycomb structure such that electric current flows through the partition walls. Additionally, a catalyst layer is supported on the partition walls. Of particular significance, the honeycomb heater includes a first portion that is resistance adjusted such that the first portion is adapted to heat more quickly than a second portion of the honeycomb heater, the first portion including an area along the gas inlet within a range of 5 to 50% of the sectional area of the inlet.

According to a preferred aspect of the invention, the first portion extends from the gas inlet but terminates before reaching the gas outlet. The partition walls of the first portion may have a different hydraulic diameter, different thickness or different cell density than the second portion of the honeycomb heater.

As described above, the honeycomb heater of the present invention is a partial heating type (a local heating type) heater in which resistance is adjusted so that a specific region (i.e., first portion) including at least a gas inlet side end surface neighborhood may be locally heated more quickly as compared with the other region (i.e., second portion) at the time of electrification. The main feature of the present invention resides in that the area of the specific region which can be locally quickly heated (this region will be hereinafter referred to as "the quick heating portion", and the other region will be referred to as "the slow heating portion") is limited to a range of 5 to 50% of the sectional area of a gas passage. Since the area of the quick heating portion is limited to the above-mentioned range, a good exhaust gas purifying performance can be obtained by the application of a relatively low electric power, and HC generated in large quantities at the time of at the cold start can be particularly effectively purified.

If the area of the quick heating portion is less than 5% of the sectional area of the gas passage, a large amount of the gas passes through the slow heating portion without being purified, and heat of reaction by the catalyst in the quick heating portion is not so expected, so that purification efficiency lowers. On the other hand, if it is more than 50%, the weight of the quick heating portion increases, and so it is necessary to increase the electric power to be applied, with the result that the effect of reducing the electric power decreases. The preferable ratio of the area of the quick heating portion to the sectional area of the gas passage is in the range of 10 to 40%, whereby there can be reduced 30% or more of the electric power required to heat a whole heating type heater in which most of the section of the gas passage is uniformly heated, and even by such a reduced electric power, a similar purification efficiency can be obtained.

BRIEF DESCRIPTION OF THE DRAWINGS

FIG. 1(a) is a plan view, and FIG. 1(b) is a front view.

FIGS. 2(a), 2(b) and 2(c) are illustrative views showing another embodiment of the present invention. FIG. 2(a) is a plan view, FIG. 2(b) is a side view, and FIG. 2(c) is a front view.

FIGS. 3(a) and 3(b) are illustrative views showing still another embodiment of the present invention. FIG. 3(a) is a plan view, and FIG. 3(b) is a front view.

DESCRIPTION OF THE PREFERRED EMBODIMENTS

Figure 1A:
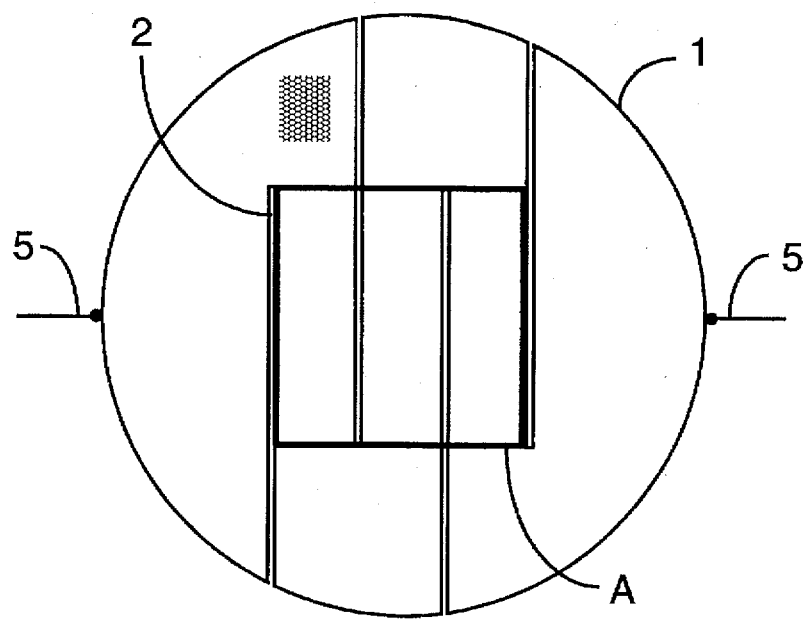
FIGS. 1(a) and 1(b) are illustrative views showing one embodiment of the present invention.

Now, the present invention will be described in more detail.

In the present invention, a honeycomb structure is made of a conductive material, and examples of the conductive material include metals such as ferrite-containing stainless steel and austenite-containing stainless steel, and ceramics such as perovskite and SiC. However, from the viewpoints of heat resistance and thermal shock resistance, the ferrite-containing stainless steel comprising Fe-Cr-Al is most preferable. Alternatively, partition walls themselves of the honeycomb structure do not have to be made of a conductive material, and for example, an insulating material such as cordierite may be coated with a conductive material such as Pt or cermet by plating or a sputtering process, whereby the coating film of the conductive material can generate heat by electrification.

The honeycomb structure may be prepared by winding up a metal foil or by an extrusion technique in accordance with a powder metallurgy method, but in view of the durability of the structure, particularly in order to get rid of telescoping under severe conditions, it is preferable to use the extrusion technique.

No particular restriction is put on the sectional shape (the cell shape) of passages which extend through the honeycomb structure, and any shape of polygons such as rectangle and hexagon, circle and corrugation can be used. However, in view of thermal shock resistance, the flexible cell shape which can relieve thermal stress, for example, the hexagonal shape is preferable.

Next, among the honeycomb structures which can be used in the present invention, an embodiment of a process for preparing the metallic honeycomb structure will be described.

In the first place, a metal powder material having a desired composition is prepared from, for example, an Fe powder, an Al powder, a Cr powder or a powder of an alloy thereof. Next, the thus prepared metal powder material is mixed with an organic binder such as methyl cellulose or polyvinyl alcohol and water, and the resulting mixture is then extruded into a desired honeycomb shape.

In the mixing step of mixing the metal powder material with the organic binder and water, it is preferable to mix the metal powder with an antioxidant such as oleic acid prior to the addition of water. Alternatively, it is also preferable to use the metal powder beforehand subjected to an antioxidizing treatment.

Next, the extruded honeycomb is fired at a temperature of 1,000° to 1,400° C. under a non-oxidizing atmosphere. In this case, the firing is preferably carried out under the non-oxidizing atmosphere containing hydrogen, because Fe or the like can be utilized as a catalyst to decompose and remove the organic binder, thereby obtaining a good sintered body.

If the firing temperature is less than 1,000° C., the molded article is not sintered, and if it is more than 1,400° C., the deformed sintered body is inconveniently obtained.

Next, the surfaces of the partition walls and pores of the obtained sintered body are coated with a heat-resistant metal oxide, if desired. Preferable methods for coating the same with the heat-resistant metal oxide are as follows.

(1) The metal honeycomb structure is thermally treated at 700° to 1,100° C. in an oxidizing atmosphere.

(2) The surfaces of the partition walls and pores of the sintered body are plated with aluminum or the like (e.g., a gaseous plating), followed by a heat treatment at 700° to 1,100° C. in the oxidizing atmosphere.

(3) The sintered body is immersed in a metal hot melt of aluminum or the like, followed by a heat treatment at 700° to 1,100° C. in the oxidizing atmosphere.

(4) The surfaces of the partition walls and pores of the sintered body are coated with an alumina sol, followed by a heat treatment at 700° to 1,100° C. in the oxidizing atmosphere.

The temperature of the heat treatment is preferably in the range of 900° to 1,100° C. from the viewpoints of heat resistance and oxidation resistance.

The honeycomb structure is provided with at least two electrodes for electrification. Here, the electrodes include an electrode on an earth side. The electrodes are connected to a power source such as a battery or a capacitor via a switch and a control device so that they may be electrified, and they can be attached to an outer or an inner periphery of the honeycomb structure.

It is essential that a catalyst layer containing a catalyst-activating substance is supported on the partition walls of the honeycomb structure so as to cover them. That is to say, the catalyst layer on the partition walls is first ignited by the electrification, and heat of reaction generated thereby heats the catalyst on the honeycomb heater, or accelerates the heating of a light-off catalyst or a main catalyst arranged on the downstream side of the heater, whereby a suitable purification performance can be exerted by the application of a low electric power.

The catalyst layer supported on the partition walls of the honeycomb structure comprises a carrier having a large surface area and the catalyst-activating substance supported on the carrier. Typical examples of the carrier having large surface area include $\gamma$-$Al_2O_3$, $TiO_2$, $SiO_2$-$Al_2O_3$ and perovskite. Typical examples of the catalyst-activating substance include noble metals such as Pt, Pd and Rh, and base metals such as Cu, Ni, Cr and Co. Among others, preferable is an example in which one or more noble metals of Pt, Pd and Rh are supported on $\gamma$-$Al_2O_3$.

The thus constituted honeycomb heater of the present invention has end surfaces on gas inlet and gas outlet sides, and an exhaust gas flows from the gas inlet side end surface to the gas outlet side end surface via the passages. The honeycomb heater is usually held preferably in an insulating state in a metallic can, and it is arranged so that the exhaust gas may be introduced into the honeycomb heater in the can through its gas inlet side end surface.

The honeycomb heater is heated by the electrification, but it is necessary that resistance is adjusted so that a specific region including at least a gas inlet side end surface neighborhood may be locally heated more quickly as compared with the other region of the heater.

The reason why the quick heating region is constituted so as to include at least the gas inlet side end surface neighborhood is that, as described above, the heat of reaction generated by locally quickly heating the upstream portion of the honeycomb heater can transfer to the lower portion of the honeycomb heater in turn to heat the catalyst layer on the downstream side of the honeycomb heater or the light-off catalyst or the like arranged in the downstream portion of the honeycomb heater. Conversely, if a gas outlet side end surface neighborhood alone is heated by the electrification, the gas inlet side end surface neighborhood is not heated, and so the same functions as a heat sink. In consequence, the power to be applied and a purification efficiency are unsatisfactory.

It is also one of suitable embodiments to uniformly (locally as seen from the section of a gas passage) and quickly heat the honeycomb heater from the gas inlet side end surface to the gas outlet side end surface in a gas flow direction. In this case, a large amount of the heat of reaction generated by the catalyst on the heater is useful to early activate the light-off catalyst or the main catalyst which is usually arranged immediately in the rear of the heater.

Even in the case that the honeycomb heater is ununiformly quickly heated from the gas inlet side end surface to the gas outlet side end surface in the gas flow direction, it is important that at least the gas inlet side end surface neighborhood is locally quickly heated.

In the present invention, the phrase "locally quickly heated" means that one or more quick heating portions and one or more slow heating portions (inclusive of non-heating portions) are present in the heater, and the honeycomb heater is heated so that the slow heating portions may be lower than a catalyst ignition temperature by 50° C. or more, preferably 100° C. or more, when the quick heating portions have reached the catalyst ignition temperature. If the temperature difference is less than 50° C., the heater is wholly heated, so that the intended effect of the power reduction is poor. If it is more than 100° C., the suitable purification performance can be exerted by the application of the relatively low electric power.

Moreover, the phrase "catalyst ignition temperature" means a temperature at which the reaction intermittently occurs without the extinction of the catalyst, and the aim of the catalyst ignition temperature is 350° C. or more. The catalyst deteriorates when used for a long period of time, and in the case of the local heating type heater, there is a problem of a heat drawing of the slow heating portions. Therefore, a temperature of 500° C. or more can be surely considered to be the catalyst ignition temperature.

In order to adjust the resistance so that the quick heating portion may be locally heated more quickly as compared with the slow heating portion, the following resistance adjustment technique can be used.

Figure 1B:
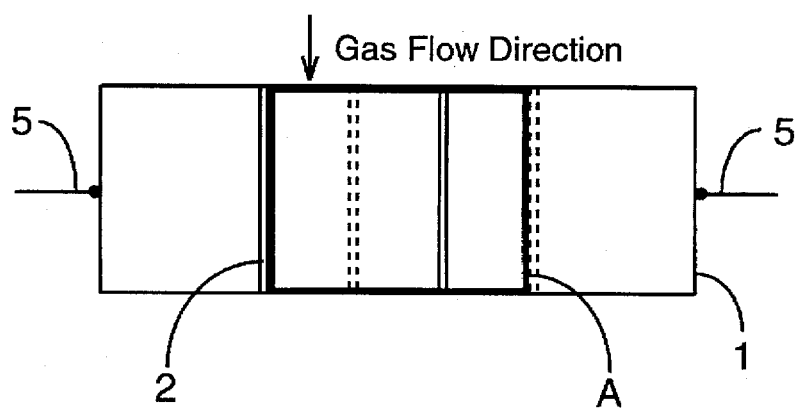

As a first resistance adjustment technique, slits 2 are formed in a honeycomb structure 1 provided with a pair of electrodes 5, as shown in FIGS. 1(a) and 1(b). in this embodiment shown in FIGS. 1(a) and 1(b), the large resistance exists in a region A between the slits 2, so that the region A generates heat predominantly to become the quick heating portion. In this case, the central portion of the honeycomb structure locally generates heat as seen from the section of a gas passage, as shown in a plan view of FIG. 1 (a), but it uniformly generates heat as seen from the flow direction of a gas, as shown in a front view of FIG. 1 (b).

As is apparent from the foregoing, it is necessary that the slits are formed so as to locally heat the specific region including at least the gas inlet side end surface neighborhood more quickly as compared with the other portion of the heater. The portion other than the hatched region of the honeycomb structure, i.e., the slow heating portion generates or scarcely generates the heat, and the heat generation state of the slow heating portion depends upon the constitution of the formed slits. In the case that the honeycomb heater is held in the can, the sectional area of the gas passage does not always correspond to the sectional area of the honeycomb structure, because the sectional area of the gas passage depends upon the holding manner of the honeycomb heater. In this connection, no particular restriction is put on the number of the slits formed in the honeycomb structure.

As an application of the first resistance adjustment technique, an orifice which vertically extends in the gas flow direction may be formed in place of the slits. Alternatively, the hydraulic diameter of the passages, the cell density or the thickness of the partition walls may be changed, or the slits (blind slits) may be partially formed in the partition walls (rib portions) of the honeycomb structure to adjust the resistance and to thereby form the quick heating portion.

As a second resistance adjustment technique, two kinds of slits are used to adjust the resistance, as shown in FIGS. 2(a), 2(b) and 2(c). A plurality of first slits 3 are formed in parallel, piercing the honeycomb structure from a gas inlet side end surface 6 to a gas outlet side end surface 7 so that the large part or the specific part of the section of the gas passage may be heated. In addition, at least one second slit 4 is formed so as to extend from the gas outlet side end surface 7 and not to reach the gas inlet side end surface 6 so that the specific region in the vicinity of the gas inlet side end surface 6 may be heated more quickly as compared with the other region. As shown by regions A1–A4 in a plan view of FIG. 2 (a), a side view of FIG. 2 (b) and a front view of FIG. 2 (c), the belt-like quick heating portions are formed on the second slits 4 in the vicinity of the gas inlet side end surface 6 by the first slits 3 and the second slits 4.

In this case, the area of the quick heating portions can easily be calculated, for example, in the following way. That is to say, in the first place, the heating properties of the quick heating portions are evaluated in still air by the use of a thermovision. Next, in order to evaluate this honeycomb heater by an actual driving test, many thermocouples are attached to the honeycomb heater, and temperatures at many positions in the quick heating portions are measured, electrifying and heating the quick heating portions in accordance with an FTP (federal test procedure) test. Thus, the area of the quick heating portions can be determined from a temperature distribution on the thermovision and the actual heating properties of the heater.

In the second resistance adjustment technique, the portions other than the quick heating portions can be constituted by a specific formation technique of the first slits so that the total surfaces of the other portions may be heated, or this second resistance adjustment technique can be combined with the above-mentioned first resistance adjustment technique to selectively heat, for example, the gas inlet side end surface neighborhood alone in the central portion of the heater. In this connection, the second slits include slits such as wide grooves.

As a third resistance adjustment technique, a plurality of slits 2 are formed in parallel so as to heat a large part or a specific part of the section of the gas passage. The quick heating portion can be formed by hollowing out an orifice 8 to extend from the gas outlet side end surface 7 and not to reach the gas inlet side end surface 6, as shown in FIGS. 3(a) and 3(b). Thus, the quick heating portion can be formed on the orifice 8 in the vicinity of the gas inlet side end surface 6 by the slits 2 and the orifice 8, as shown by region A in a plan view of FIG. 3 (a) and a front view of FIG. 3 (b).

Figure 4:
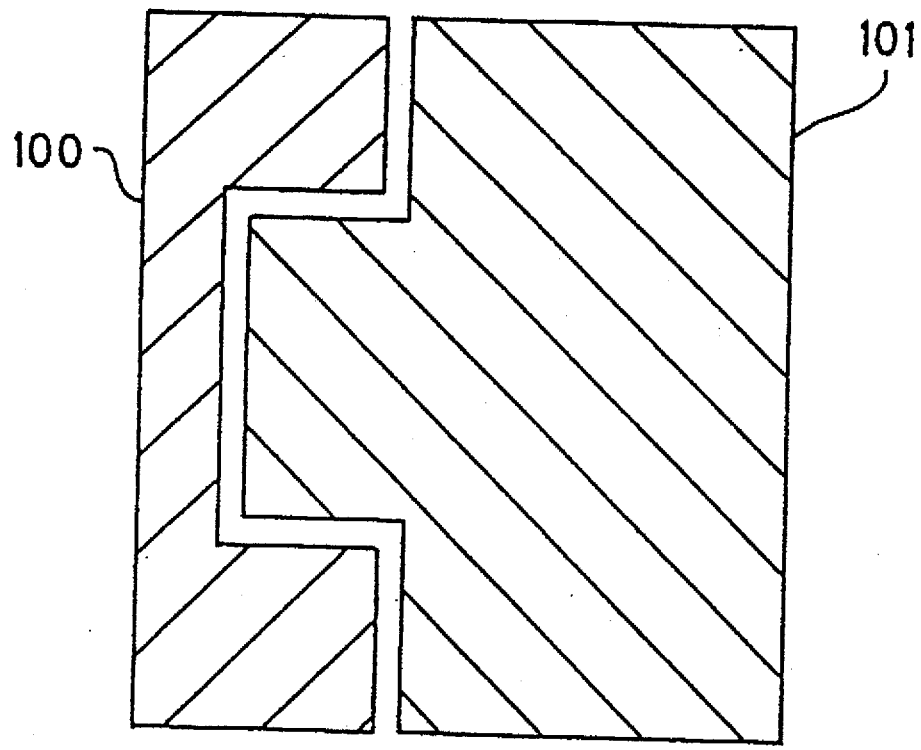
FIG. 4 is a sectional view illustrating one arrangement of a heater of the present invention and a light-off catalyst.

In the case of the third resistance adjustment technique, the light-off catalyst which is arranged on the downstream side of the honeycomb heater is molded into a convex shape corresponding to the orifice 8, and a honeycomb heater 100 and a light-off catalyst 101 can be used as closely as possible, as shown in FIG. 4. In this technique, in place of such a relatively large orifice 8 as shown in FIGS. 3(a) and 3(b), an orifice having a relatively small diameter may be formed so as to extend from the gas outlet side end surface 7 and not to reach the gas inlet side end surface 6 or to reach the same, whereby the resistance can be regulated to form the quick heating portion. In place of the formation of the orifice, the hydraulic diameter of the passages, the cell density or the thickness of partition walls may be changed, or the slits (blind slits) may be partially formed in the partition walls (rib portions) of the honeycomb structure to adjust the resistance and to thereby form the quick heating portion.

The above-mentioned first to third resistance adjustment techniques can be utilized in an optional combination thereof. These techniques are mere embodiments, and in the present invention, there can be used other various resistance adjusting means which can prepare the quick heating portion having an area as much as 5 to 50% of the sectional area of the gas passage, in addition to the above-mentioned techniques. The one quick heating portion or the plurality of separate quick heating portions may be provided in the center of the section of the gas passage.

The honeycomb heater of the present invention aims at a low-power type, and so the preparation of the relatively small heater is preferable. Concretely, the volume of the gas passage portion is set to about 30 to 300 cc. If the volume of the gas passage portion is less than 30 cc, the mechanical strength of the heater is poor and the effective area of the catalyst on the heater is limited, so that the heat of reaction obtained therefrom is insufficient and hence the desired purifying performance cannot be obtained. Conversely, if it is more than 300 cc, the honeycomb heater becomes a local heating type, but the weight of the heater increases, so that the application of an increased electric power is required. The preferable volume of the heater is in the range of 40 to 150 cc, and the effective purification can be achieved with a low electric power of less than 3 kW, depending upon a position where the heater is arranged.

"The low electric power" referred to herein means that wattage×time is as low as possible, but the long-time electrification at a low wattage is more preferable than the short-time electrification at a high wattage. That is to say, for the electrification at high wattage, a high voltage and/or a large current is necessary. In the case of the high voltage, a complicated power source system and control system are required, and in the case of the large current, extremely thick cables and the like are required. Thus, in the case of a gasoline car, the battery power source and the current are preferably adjusted to be 12 V and 200 A or less, respectively. In this case, a power of 2 kW or less is to be applied to the heater, in view of internal resistances of the battery and the control system. As the power source, an alternater and an ultracapacitor can be preferably used in addition to the battery.

The length of the honeycomb heater is usually in the range of 6 to 40 mm, depending upon the sectional area of the honeycomb heater. If the length of the honeycomb heater is less than 6 mm, deformation occurs owing to creep at the time of a high temperature, and if it is more than 40 mm, the honeycomb heater deforms owing to thermal stress generated in the heater.

The length of the quick heating portion in a gas flow direction is 25 mm or less from the exhaust gas inlet end surface, and it is equal to or less than the length of the heater. If the length of the quick heating portion is more than 25 mm, the heat capacity of the quick heating portion increases, so that the problem of the electric power to be applied takes place inconveniently.

The thickness of the partition walls of the honeycomb heater is preferably in the range of about 40 to 300 μm, and the cell density is preferably in the range of 150 to 600 cells/inch$^2$.

In order to efficiently purify harmful substances in the exhaust gas, particularly HC generated in large quantities at the time of the cold start by the use of the honeycomb heater of the present invention described above, the electrification is preferably carried out so that the quick heating portion may reach a catalyst ignition temperature within 20 seconds from the cold start.

The electrification of the heater is carried out in an optional manner, for example, by a preheating means for starting the electrification before engine crank, a postheating means for starting the electrification immediately after the engine crank, or a combination of the preheating means and the postheating means, and this electrification can be done continuously or intermittently. In view of the simplicity of the control system, the postheating means is preferable, and it is also preferable to continuously apply the power once, at the time of the cold start.

It is preferred that the temperature of the quick heating portion reaches 500° C. or more as early as possible, and in the Bag 1 of an FTP test, it is one aim that the temperature is reached within 20 seconds (at the time of idling). At this time, the upper limit of the temperature of the quick heating portion is about 1,000° C., and so the temperature of the quick heating portion is preferably 1,000° C. or less. If the temperature of the quick heating portion is in excess of 1,000° C., there is a fear that the honeycomb heater is deformed or broken owing to thermal stress generated by a temperature difference between the quick heating portion and the slow heating portion.

In the case that the exhaust gas purification system is constituted of such a honeycomb heater as in the present invention, the so-called light-off catalyst or main catalyst is usually arranged on the downstream side of the honeycomb heater. Since the honeycomb heater is operated with the low power, its size is relatively small, and so the honeycomb heater itself is insufficient to purify all the HC exhausted at the cold start. Therefore, the relatively small (about 0.2 to 1.2 l) light-off catalyst is arranged on the downstream side of the honeycomb heater. In addition, for the purpose of improving the purification performance at a steady drive (e.g., Bag 2), the so-called main catalyst having a relatively large volume (about 1 to 3 l) is arranged on the downstream side of the light-off catalyst.

As another constitution, for example, the relatively small (about 0.2 to 1.2 l) light-off catalyst may be arranged on the most upstream side of the exhaust gas flow passage, and the honeycomb heater may follow, and the light-off catalyst and the main catalyst may be further arranged on the downstream side of the honeycomb heater. In this case, the application of a little much power to the honeycomb heater is required as compared with the constitution in which the honeycomb heater is arranged on the most upstream side, but the most upstream light-off catalyst functions as a thermal shock absorber, so that it is not necessary any more to be anxious about the durability of the honeycomb heater.

The above-mentioned "light-off catalyst" and "main catalyst" are common names, and in short, they are catalysts having a catalytic function capable of purifying the exhaust gas discharged from an internal combustion engine. In general, as these catalysts, there can be used ceramic or metallic honeycomb structures on which a catalyst activating substance having the catalytic function is supported in the form of a catalyst layer.

The honeycomb heater is preferably arranged at the so-called manifold position in the vicinity of an engine exhaust port so as to utilize exhaust heat. In this case, the honeycomb heater is exposed to particularly severe exhaust gas conditions, and so it is preferable to use the honeycomb heater prepared by an extrusion method, as described above. When arranged at the manifold position, the honeycomb heater exerts the suitable purification performance with an electric power of 1 kW or less.

At the time of the cold start, a car is usually driven in a rich fuel state, but in such a state, the HC purification performance of the honeycomb heater is insufficient, even if the heater is quickly heated. Thus, the introduction of secondary air is effective, or it is also preferable that after engine crank, the amounts of the fuel and air are adjusted to shift the composition of the exhaust gas to a nearly stoichiometric amount or a slightly lean side.

As described above, according to the present invention, harmful substances in an exhaust gas discharged from an internal combustion engine, particularly HC generated in large quantities at the time of a cold start can be effectively purified with low electric power.

Next, the present invention will be described in more detail with reference to examples, but the scope of the present invention should not be limited to these examples.

[Preparation of Honeycomb Heaters]

Heaters A to C

An Fe powder, a Cr-30 Al powder (wt %), an Fe-50 Al powder (wt %), an Fe-20 B powder (wt %) and a $Y_2O_3$ powder, all having an average particle diameter of 44 μm or less were mixed so as to obtain a composition of Fe-16 Cr-8 Al-0.05 B-0.5 $Y_2O_3$. Next, 4 g of methyl cellulose as an organic binder and 1 g of oleic acid as an antioxidant were added to and mixed with 100 g of the resulting mixture. After the preparation of such a clay, it was then extruded into a cylindrical honeycomb article.

This honeycomb article was dried at 90° C. for 16 hours in the atmosphere, and then held at 1,325° C. for 2 hours to sinter the article. Next, the article was subjected to a heat treatment at 1,150° C. for 30 minutes in air.

In accordance with the above-mentioned procedure, a honeycomb structure was obtained which had an outer diameter of 93 mm, a thickness of 12 mm, a partition wall thickness of 0.1 mm and a hexagonal cell density of 450 cells/inch$^2$. The porosity of this honeycomb structure was 2% (substantially non-porous), and a protective layer of an $Al_2O_3$ component was formed on the surface of the honeycomb structure.

Afterward, the above-mentioned first resistance adjustment technique was used to form slits in this honeycomb structure, whereby its central portion was constituted so as to be quickly heated.

After the formation of the slits, a mixture of γ-$Al_2O_3$ and $CeO_2$ was prepared so that a weight ratio of γ-$Al_2O_3$:$CeO_2$ might be 70:30, and water and a trace amount of nitric acid were then added to the mixture. Afterward, the mixture was ground by a wet method to prepare a carrier slurry, and a wash coat was then formed on the honeycomb structure in accordance with a dipping method by the use of this carrier slurry. Next, this wash coat was dried, and then fired at a temperature of 500° C. to cover the honeycomb structure with γ-$Al_2O_3$ and $CeO_2$. The thus treated honeycomb structure was immersed in an aqueous solution comprising palladium nitrate, chloroplatinic acid and rhodium nitrate for about 20 minutes so that a molar ratio of Pd:Pt:Rh might be 6:5:1 and so that the total amount of the supported components might be 80 g/ft$^3$, whereby a catalyst composition was supported on the honeycomb structure.

Next, electrode bolts were welded at two positions on the outer periphery of the honeycomb structure to prepare a honeycomb heater. This honeycomb heater was held in a metallic can by fixing the outer periphery of the honeycomb heater via an insulating material. The diameter of the gas passage was reduced to 82 mm by a retainer.

As a result, three kinds of honeycomb heaters were obtained in which areas of the quick heating portions were 10% (a heater A), 25% (a heater B) and 50% (a heater C) of the sectional area of the gas passage, respectively.

Heaters D and E

First slits and second slits were formed in each honeycomb structure by the use of the above-mentioned second resistance adjustment technique to prepare honeycomb heaters in which belt-like quick heating portions could be formed on the second slits. The number of the first slits was 8, and the number of the second slits was 4 (a heater D) or 6 (a heater E). Furthermore, the area of the quick heating portion was 5% (the heater D) or 15% (the heater E) of the sectional area of a gas passage. The preparation of the honeycomb structure, the support of a catalyst composition, the holding of the honeycomb heater by a can, and the like were carried out by the same procedures as in the above-mentioned heaters A to C.

Heater F

An orifice having a diameter of 2.1 mm and a depth of 6 mm was formed at the central portion of a honeycomb structure from its gas outlet side end surface by the use of the above-mentioned third resistance adjustment technique, and 8 slits were then formed in the honeycomb structure to prepare a honeycomb heater in which a position where the orifice was formed became a quick heating portion. The area of the quick heating portion was 25% of the sectional area of a gas passage. The preparation of the honeycomb structure, the support of a catalyst composition, the holding of the honeycomb heater by a can, and the like were carried out by the same procedures as in the above-mentioned heaters A to C.

Heater G

A whole heating type honeycomb heater in which nearly all (90%) of the section of a gas passage could be uniformly heated was prepared by the same procedures as in the heaters A to C.

Heater H

The same procedure as in the heaters D and E was carried out except that one second slit was formed, to prepare a honeycomb heater in which the area of a quick heating portion was extremely small (3%).

Heater I

The same procedure as in the heater G was carried out except that the thickness of a honeycomb structure was set to ½ (6 mm) of that of the honeycomb structure of the heater G, to prepare a whole heating type honeycomb heater in which nearly all (90%) of the section of a gas passage could be uniformly heated.

[FTP Test]

Figure 5:
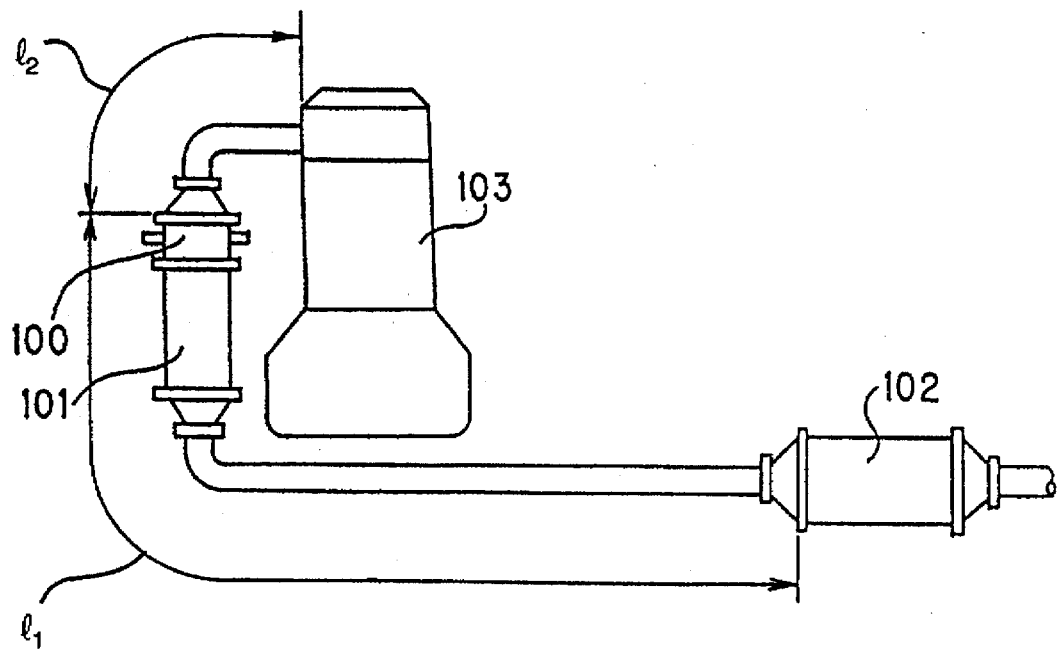
FIG. 5 is a schematic view of a manifold system used to evaluate the performance of the heaters in examples.
Figure 6:
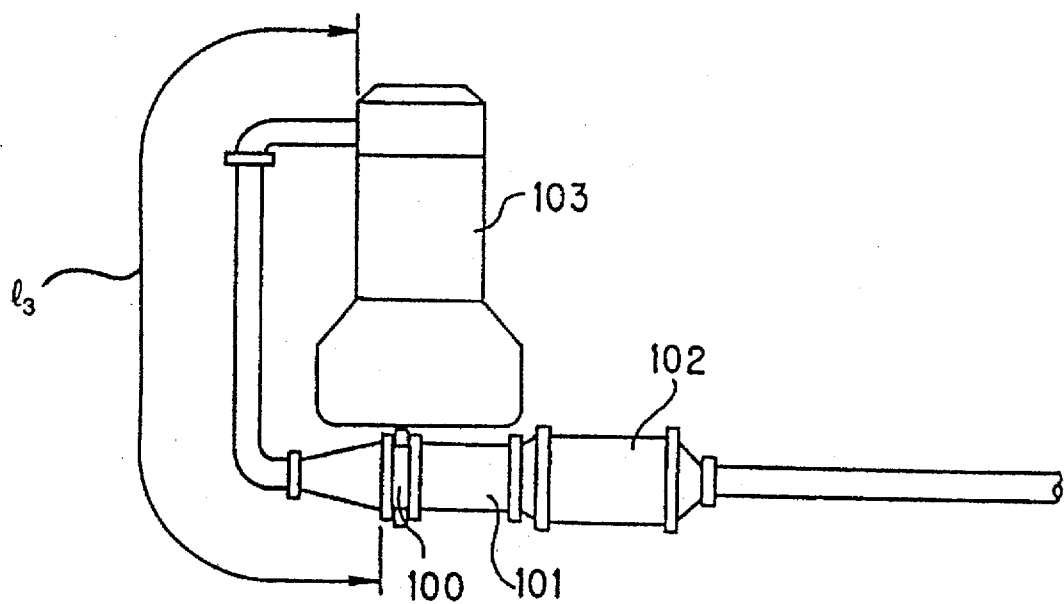
FIG. 6 is a schematic view of an undertoe system used to evaluate the performance of the heaters in the examples.

The heaters A to I obtained by the above-mentioned procedures were used, and a light-off catalyst having a volume of 0.9 l was arranged immediately on the downstream side of each heater. Next, a main catalyst having a volume of 1.7 l was arranged on the further downstream side of the light-off catalyst to constitute two kinds of exhaust systems shown in FIGS. 5 and 6 (a manifold system and an undertoe system). In the drawings, reference numeral 100 was a honeycomb heater, numeral 101 was a light-off catalyst, 102 was a main catalyst, and 103 was an engine. This engine was an L4 type having a displacement volume of 2,000 cc. In FIGS. 5 and 6, dimensions $l_1$=1150 mm, $l_2$=400 mm and $l_3$=1,000 mm.

The honeycomb heater, the light-off catalyst and the main catalyst were all exposed to a stoichiometric exhaust gas having an inlet temperature of 850° C., and acceleratedly consumed in a mode in which a fuel was cut for 5 seconds every one minute to deteriorate them. The thus treated honeycomb heater, light-off catalyst and main catalyst were then used.

Bag emission was measured in accordance with FTP (federal test procedure) under conditions shown in Table 1 to evaluate cold start properties of the honeycomb heaters of Examples 1 to 8 and Comparative Examples 1 to 5. During this measurement, secondary air was introduced into the exhaust system from the upstream side of the honeycomb heater at 120 l/min for 100 seconds from the start of the engine. Furthermore, electrification was given by the use of a constant-voltage generator, and voltage was regulated so as to obtain a predetermined kW value. An electrification time was 30 seconds after engine crank.

TABLE 1

| Heater | System | Applied Power (kW) | Area of quick Heating Portion (%) |
|---|---|---|---|
| Example 1 | A | MF*¹ | 1.0 | 10 |
| Example 2 | B | " | " | 25 |
| Example 3 | C | " | " | 50 |
| Example 4 | D | " | " | 5 |
| Example 5 | E | " | " | 15 |
| Example 6 | F | " | " | 25 |
| Example 7 | G | UT*² | 2.0 | 25 |
| Example 8 | H | " | " | 5 |
| Comp. Ex. 1 | G | MF | 1.0 | 90 |
| Comp. Ex. 2 | H | " | " | 3 |
| Comp. Ex. 3 | I | " | " | 90 |
| Comp. Ex. 4 | G | UT | 2.0 | 90 |
| Comp. Ex. 5 | I | " | " | 90 |

*¹MF: Manifold system (FIG. 5).
*²UT: Undertoe systme (FIG. 6).

TABLE 1 (Continued)

| | FTP Performance (HC emission) | | Heating Time of Quick Heating Portion | |
|---|---|---|---|---|
| | Bag 1A*³ (g) | Bag 1 (g/mile) | 400° C.*⁴ | 500° C.*⁵ |
| Example 1 | 0.78 | 0.20 | 8 | 13 |
| Example 2 | 0.79 | 0.20 | 9 | 18 |
| Example 3 | 0.80 | 0.21 | 10 | 20 |
| Example 4 | 0.75 | 0.21 | 5 | 10 |
| Example 5 | 0.73 | 0.18 | 7 | 12 |
| Example 6 | 0.72 | 0.17 | 5 | 10 |
| Example 7 | 0.77 | 0.18 | 8 | 16 |
| Example 8 | 0.76 | 0.18 | 6 | 12 |
| Comp. Ex. 1 | 0.86 | 0.25 | 17 | 35 |
| Comp. Ex. 2 | 0.87 | 0.24 | 3 | 5 |
| Comp. Ex. 3 | 0.98 | 0.24 | 14 | 30 |
| Comp. Ex. 4 | 0.90 | 0.25 | 12 | 28 |
| Comp. Ex. 5 | 0.89 | 0.26 | 14 | 23 |

*³Bag 1A: Amount of HC discharged for 140 seconds from engine start.
*⁴400° C.: Time (sec) taken until 400° C. was reached from electrification start.
*⁵500° C.: Time (sec) taken until 500° C. was reached from electrification start.

What is claimed is:

1. A honeycomb heater, comprising:

a honeycomb structure including a plurality of partition walls comprised of a conductive material, said partition walls forming a plurality of passages extending substantially parallel to a gas flow direction, said honeycomb structure having a first end providing a gas inlet of a predetermined sectional area formed by said passages through which gas flows and a second end providing a gas outlet formed by said passage through which gas flows, a plurality of slits extending through the honeycomb structure parallel to each other and transverse to the passages, and at least two electrodes connected to the honeycomb structure such that electric current is flowed through the partition walls; and a catalyst layer coated on the partition walls, wherein the honeycomb heater further includes first and second portions, wherein said first portion has an adjusted resistance such that the first portion is adapted to heat more quickly than said second portion and the partition walls in the first portion having a different hydraulic diameter than the partition walls in the second portion, said first portion including at least an end of the partition walls along said gas inlet and having an area along said gas inlet within a range of 5 to 50% of the sectional area of the gas inlet.

2. A honeycomb heater, comprising:

a honeycomb structure including a plurality of partition walls comprised of a conductive material, said partition walls forming a plurality of passages extending substantially parallel to a gas flow direction, said honeycomb structure having a first end providing a gas inlet of a predetermined sectional area formed by said passages through which gas flows and a second end providing a gas outlet formed by said passages through which gas flows, a plurality of slits extending through the honeycomb structure parallel to each other and transverse to the passage, and at least two electrodes connected to the honeycomb structure such that electric current is flowed through the partition walls; and a catalyst layer coated on the partition walls, wherein the honeycomb heater further includes first and second portions, wherein said first portion has an adjusted resistance such that the first portion is adapted to heat more quickly than said second portion thereby the partition walls in the first portion having a thickness that is different from a thickness in partition walls of the second portion, said first portion including at least an end of the partition walls along said gas inlet and having an area along said gas inlet within a range of 5 to 50% of the sectional area of the gas inlet.

3. A honeycomb heater, comprising:

a honeycomb structure including a plurality of partition walls comprised of a conductive material, said partition walls forming a plurality of passages extending substantially parallel to a gas flow direction, said honeycomb structure having a first end providing a gas inlet of a predetermined sectional area formed by said passages through which gas flows and a second end providing a gas outlet formed by said passages through which gas flows, a plurality of slits extending through the honeycomb structure parallel to each other and transverse to the passages, and at least two electrodes connected to the honeycomb structure such that electric current is flowed through the partition walls; and a catalyst layer coated on the partition walls, wherein the honeycomb heater further includes first and second portions, wherein said first portion has an adjusted resistance such that the first portion is adapted to heat more quickly than said second portion and said first portion having a different cell density than a cell density of the second portion, said first portion including at least an end of the partition walls along said gas inlet and having an area along said gas inlet within a range of 5 to 50% of the sectional area of the gas inlet.

4. A method of operating a honeycomb heater comprising the steps of:

providing a honeycomb heater comprising a honeycomb structure including a plurality of partition walls comprised of a conductive material, said partition walls forming a plurality of passages extending substantially parallel to a gas flow direction, said honeycomb structure having a first end providing a gas inlet of a predetermined sectional area formed by said passages through which gas flows and a second end providing a gas outlet formed by said passages through which gas flows, and at least two electrodes connected to the honeycomb structure such that electric current is flowed through the partition walls; and a catalyst layer coated on the partition walls, wherein the honeycomb heater further includes first and second portions, wherein said first portion has an adjusted resistance such that the first portion is adapted to heat more quickly than said second portion, said first portion (i) including least an end of the partition walls along said gas inlet, (ii) extending axially along the honeycomb structure and terminating before reaching the gas outlet, and (iii) having an area along said gas inlet within a range of 5 to 50% of the sectional area of the gas inlet; and electrifying the honeycomb heater such that said first portion is locally quickly heated to reach a catalyst ignition temperature within twenty seconds.

* * * * *